July 24, 1951    H. S. KIRKPATRICK    2,562,043
METHOD OF DRYING TOBACCO
Original Filed Sept. 26, 1946
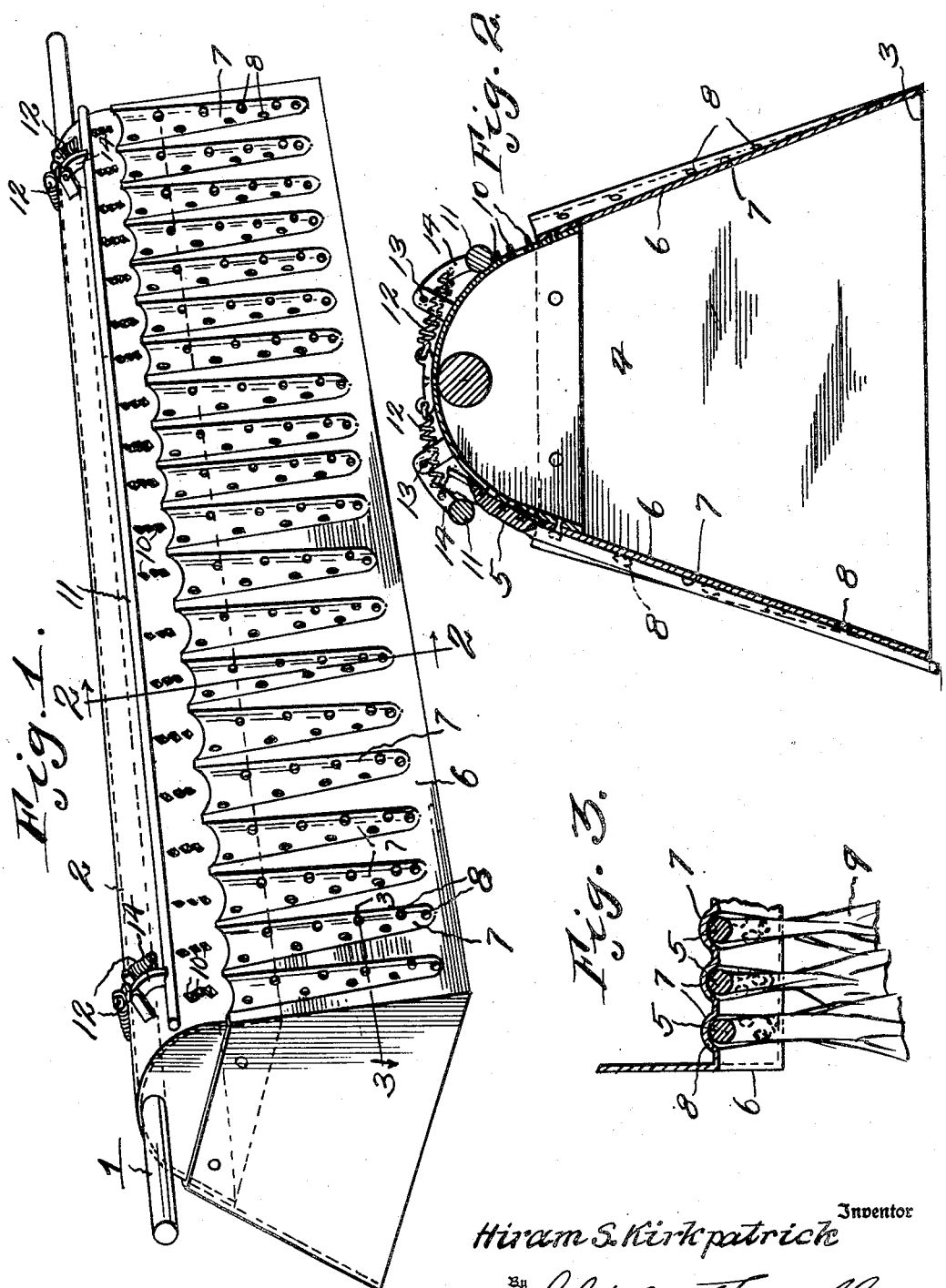
Inventor
Hiram S. Kirkpatrick
By Philip A. H. Terrell
his Attorney Patented July 24, 1951

2,562,043

UNITED STATES PATENT OFFICE 2,562,043

METHOD OF DRYING TOBACCO

Hiram S. Kirkpatrick, Fayetteville, N. C.

Original application September 26, 1946, Serial No. 699,421. Divided and this application December 6, 1948, Serial No. 63,654

2 Claims. (Cl. 131—140)

The invention relates to method of drying tobacco, and has for its object to provide a method of curing tobacco, curing the leaves at a predetermined temperature and collecting and intensifying heat to a higher temperature, and directing the intensified heat directly against the leaf stems, thereby insuring a uniform curing and the production of a high grade tobacco.

In the drawing:

Figure 1 is a perspective view of a leaf support and drier, particularly adapted for use in carrying out the method.

Figure 2 is a vertical transverse sectional view through the device, taken on line 2—2 of Figure 1.

Figure 3 is a horizontal sectional view taken on line 3—3 of Figure 1.

This application is a divisional part of my application, Serial Number 699,421, filed September 26, 1946, now Patent No. 2,455,684.

Referring to the drawing, the numeral 1 designates an elongated pole, the ends of which are adapted to rest on horizontal bars in a barn for the curing operation.

The pole 1 extends through a downwardly flared heat collecting and tobacco leaf supporting member 2, having its lower end open, as at 3, and provided with a heat collecting chamber 4.

It has been found, by providing a heat collecting chamber, that the heat within the chamber is intensified, for instance, it is usual to cure tobacco leaves in a barn or warehouse at a temperature of 130 degrees, so the bodies of the leaves will be cured to a yellow color. However, the stems 5 will not thoroughly cure, under normal conditions, under four to six days. Where a collecting chamber 4 is used, the temperature within the chamber will be increased or intensified to about 185 degrees, or slightly above, where a 130 degree temperature is used in the barn, and the present method contemplates the use of this intensified heat for drying the stems 5, which stems can be dried in about four hours. To accomplish this result, the opposite sides or walls 6 of the chambered member 2 are provided with downwardly extending channels 7, having perforations 8. The stems of the leaves 9 are placed in the channels, and it will be seen that the hot or intensified air within the chamber 4 will pass through the perforations 8 into direct contact with the stems 5, hence the intensified or high degree of heat will dry the stems rapidly, consequently the high quality of the tobacco maintained and the drying operation reduced to a few hours, in comparison with the present practice, requiring several days.

In operation, the operator places the stems of the leaves in the channels 7, and secures the stems in place by an inward push thereon, against the struck-out prongs 10. After the leaves are assembled on one side the spring actuated clamping bar 11, for that particular side, is lowered and maintained in clamped position by the coiled springs 12. Following this operation, the other side of the chambered member is filled with leaves in the same manner, and the clamping bar 11 is moved downwardly to a clamping position, as shown in Figure 2. It will be noted that the pivotal points 13 of the arms 14 of the clamping bars will bisect the springs 12 during the clamping and unclamping operation, hence it will be seen that the leaves may be easily and quickly clamped or released when desired. After the device is filled with leaves it is placed in a barn on supports, using the ends of the pole.

The chambered member is preferably formed in two sections, however it is to be understood it may be constructed from a single piece of metal stamped to form.

The stem receiving channels, preferably, taper downwardly to conform, as near as possible, to the downward taper of the leaf stems to get a better concentration of heat on the tapered stems.

From the above it will be seen that a method of curing tobacco is provided wherein the leaves are supported in a manner whereby they will be subjected to a predetermined heat, and the predetermined heat will be collected and intensified to a higher degree and directed against the stems of the leaves for rapidly and uniformly drying the leaves and stems as a whole, as the stems contain considerably more moisture than the leaves.

The invention having been set forth what is claimed as new and useful is:

1. A method of curing stemmed leaves which comprises providing a heated chamber, positioning in said heated chamber a perforated enclosure, placing said stemmed leaves on opposite sides of said enclosure with the butts of the stems uppermost and the butts of the stems and leaf portions of said leaves in abutting relation with the oppposite walls of said enclosure and with leaves on opposite sides of said enclosure in bias relation to each other, permitting the heated air within said heated chamber to collect within the enclosure, whereby the temperature within the enclosure due to the tendency of warm incoming air to seek and remain at the upper levels will result in a higher temperature at the upper portion of the interior of the enclosure and a lower temperature at the lower portion of the interior of the enclosure, thereby permitting passage of the warmer air from a zone closely adjacent of the major portion of the stem structure of the leaves and passage of the cooler air to the major portion of the leaf structure of the leaves.

2. A method of curing stemmed tobacco leaves which comprises providing a heated chamber, positioning in said heated chamber a perforated enclosure, placing said stemmed leaves on opposite sides of said enclosure with the butts of the stems uppermost and the butts of the stems and leaf portions of the said leaves in abutting relation with the opposite walls of said enclosure and with leaves on opposite sides of said enclosure in bias relation to each other, permitting the heated air within said heated chamber to collect within the enclosure, whereby the temperature within the enclosure due to the tendency of warm incoming air to seek and remain at the upper levels will result in a higher temperature at the upper portion of the interior of the enclosure and a lower temperature at the lower portion of the interior of the enclosure, thereby permitting passage of the warmer air from a zone closely adjacent of the major portion of the stem structure of the leaves and passage of the cooler air to the major portion of the leaf structure of the leaves.

HIRAM S. KIRKPATRICK.

REFERENCES CITED

The following references are of record in the file of this patent:

UNITED STATES PATENTS

| Number | Name | Date |
| --- | --- | --- |
| 2,105,848 | Touton | Jan. 18, 1938 |